(12) United States Patent
Muto et al.

(10) Patent No.: US 11,983,543 B2
(45) Date of Patent: May 14, 2024

(54) INFORMATION PROCESSING DEVICE, CONTROL METHOD, AND CONTROL PROGRAM

(71) Applicant: NIPPON TELEGRAPH AND TELEPHONE CORPORATION, Tokyo (JP)

(72) Inventors: Kenichiro Muto, Musashino (JP); Kimihiro Yamakoshi, Musashino (JP); Takeshi Nakatsuru, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 197 days.

(21) Appl. No.: 17/621,698

(22) PCT Filed: Jun. 24, 2019

(86) PCT No.: PCT/JP2019/024990
§ 371 (c)(1),
(2) Date: Dec. 22, 2021

(87) PCT Pub. No.: WO2020/261340
PCT Pub. Date: Dec. 30, 2020

(65) Prior Publication Data
US 2022/0350612 A1 Nov. 3, 2022

(51) Int. Cl.
*G06F 9/4401* (2018.01)
*G06F 9/445* (2018.01)

(52) U.S. Cl.
CPC ............ *G06F 9/442* (2013.01); *G06F 9/4406* (2013.01); *G06F 9/44505* (2013.01)

(58) Field of Classification Search
CPC ..... G06F 9/442; G06F 9/4406; G06F 9/44505
USPC .......................................................... 713/2
See application file for complete search history.

(56) References Cited

U.S. PATENT DOCUMENTS

| | | | |
|---|---|---|---|
| 6,385,623 B1* | 5/2002 | Smith | G06F 8/65 |
| 10,317,985 B2* | 6/2019 | Cochran | G06F 1/3296 |
| 10,642,596 B2* | 5/2020 | Tanimoto | G06F 8/65 |
| 11,316,770 B2* | 4/2022 | Fujiki | H04L 43/062 |
| 11,599,426 B2* | 3/2023 | Jeansonne | G06F 11/1415 |
| 2012/0131365 A1* | 5/2012 | Tabone | G06F 1/3203 713/320 |
| 2016/0283338 A1* | 9/2016 | Ramalingam | G06F 3/0632 |
| 2020/0272742 A1* | 8/2020 | Kataria | G06F 21/577 |

OTHER PUBLICATIONS

IPA, "Information Security Technology Survey Task Group Report (First half-year, 2009)", Available Online at:https://www.ipa.go.jp/security/fy21/reports/tech1-tg/indexa.html, Sep. 2009, 113 pages including English Translation.

(Continued)

Primary Examiner — Brian T Misiura
(74) Attorney, Agent, or Firm — XSENSUS LLP

(57) ABSTRACT

An information processing device includes processing circuitry configured to determine whether or not there is integrity in predetermined data regarding a boot sequence of an Operating System (OS) during execution of shutdown of the OS, arid suspend shutdown of the OS when it is determined that there is no integrity in the predetermined data.

20 Claims, 6 Drawing Sheets

(56) References Cited

OTHER PUBLICATIONS

UEFI, "Unified Extensible Firmware Interface Specification Version 2.6", Available Online at:http://www.uefi.org/sites/default/files/resources/UEFI%20Spec%202_6.pdf, Jan. 2016, 2706 pages.

Microsoft, "Method of Replacing In-use Files at Windows Restart", Available Online at:https://support.microsoft.com/ja-jp/help/181345/how-to-replace-in-use-files-at-windows-restart, Apr. 20, 2018, 5 pages including English Translation.

Microsoft, "MoveFileEx function", Available Online at:https://msdn.microsoft.com/ja-jp/windows/aa365240 (v=vs.80), 8 pages.

Technet, "About wininit.exe", Available Online at:https://social.technet.microsoft.com/Forums/ja-JP/b0114542-e0ad-4e87-8306-170396f6d5f6/wininitexe12395123881235612390?forum=windowsvistaja, 8 pages including English Translation.

* cited by examiner

INFORMATION PROCESSING DEVICE, CONTROL METHOD, AND CONTROL PROGRAM

CROSS-REFERENCE TO RELATED APPLICATION

The present application is based on PCT filing PCT/JP2019/024990, tiled Jun. 24, 2019, the entire contents of which are incorporated herein by reference.

TECHNICAL FIELD

The present invention relates to an information processing device, a control method and a control program.

BACKGROUND ART

Conventionally, in an apparatus such as a server, a technology of confirming integrity for programs executed during a boot sequence of the apparatus has been proposed. For example, a method of verifying the integrity of each program using a hash value of each program executed during the boot sequence of a system and a hash value recorded beforehand in a TPM (Trusted Platform Module) is known (see Non-Patent Literature 1, for example). In addition, a method of configuring an integrity-verified OS (Operating System) environment by interlinking a method of executing only the program the integrity of which is confirmed by an electronic signature imparted beforehand during the boot sequence of the system is known.

Further, there is a technology of updating a file during the boot sequence when an apparatus such as a server is rebooted. For example, in a Windows (registered trademark) OS, there is a mechanism of updating a file using a registry and a configuration file (see Non-Patent Literatures 3 to 5, for example).

CITATION LIST

Non-Patent Literature

Non-Patent Literature 1: IPA, "Information Security Technology Survey Task Group Report (First half-year, 2009)", pp.11-13, September 2009, https://www.ipa.go.jp/security/fy21/reports/techl-tg/indexa.html Non-Patent Literature 2: UEFI "Unified Extensible Firmware Interface Specification Version 2.6", pp.1803-1808, January 2016, http://www.uefi.org/sites/default/files/resources/UEFI%20Spec%202_6.pdf Non-Patent Literature 3: Microsoft, "Method of Replacing In-use Files at Windows Restart", 2018 Apr. 20, https://support.microsoft.com/ja-jp/help/181345/how-to-replace-in-use-files-at-windows-restart Non-Patent Literature 4: Microsoft, "MoveFileEx function", https://msdn.microsoft.com/ja-jp/windows/aa365240(v=vs.80)

Non-Patent Literature 5: TechNet, "About wininit.exe", https://social.technet.microsoft.com/Forums/ja-JP/b0114542-e0ad-4e87-8306-170396f6d5f6/wininitexe12395123881235612390?forum=windowsvistaja

SUMMARY OF THE INVENTION

Technical Problem

However, the conventional technologies have a problem in that it is sometimes difficult to avoid file alteration and execution of an altered program.

For example, when entries of the configuration file and the registry described in Non-Patent Literatures 3 to 5 are altered, in an apparatus not loaded with the TPM and an environment where signature verification cannot be executed or the like, it is conceivable that the methods described in Non-Patent Literatures 1 and 2 cannot be executed and the file alteration and the execution of the altered program cannot be avoided.

Specifically, in the apparatus not loaded with the TPM, there is a case where Trusted Boot described in Non-Patent Literature 1 cannot be applied. In addition, under the environment where BootLoader or OS alteration cannot be allowed, there is the case where SecureBoot described in Non-Patent Literature 2 cannot be applied.

Means for Solving the Problem

In order to solve the above-described problem and achieve an object, an information processing device includes: processing circuitry configured to: determine whether or not there is integrity in predetermined data regarding a boot sequence of an Operating System (OS) during execution of shutdown of the OS; and suspend shutdown of the OS when it is determined that there is no integrity in the predetermined data.

Effects of the Invention

According to the present invention, file alteration and execution of an altered program can be avoided.

DESCRIPTION OF EMBODIMENTS

Hereinafter, an embodiment of an information processing device, a control method and a control program relating to the present application will be described in detail based on the drawings. Note that the present invention is not limited by the embodiment described below.

Functional Configuration

Figure 1:
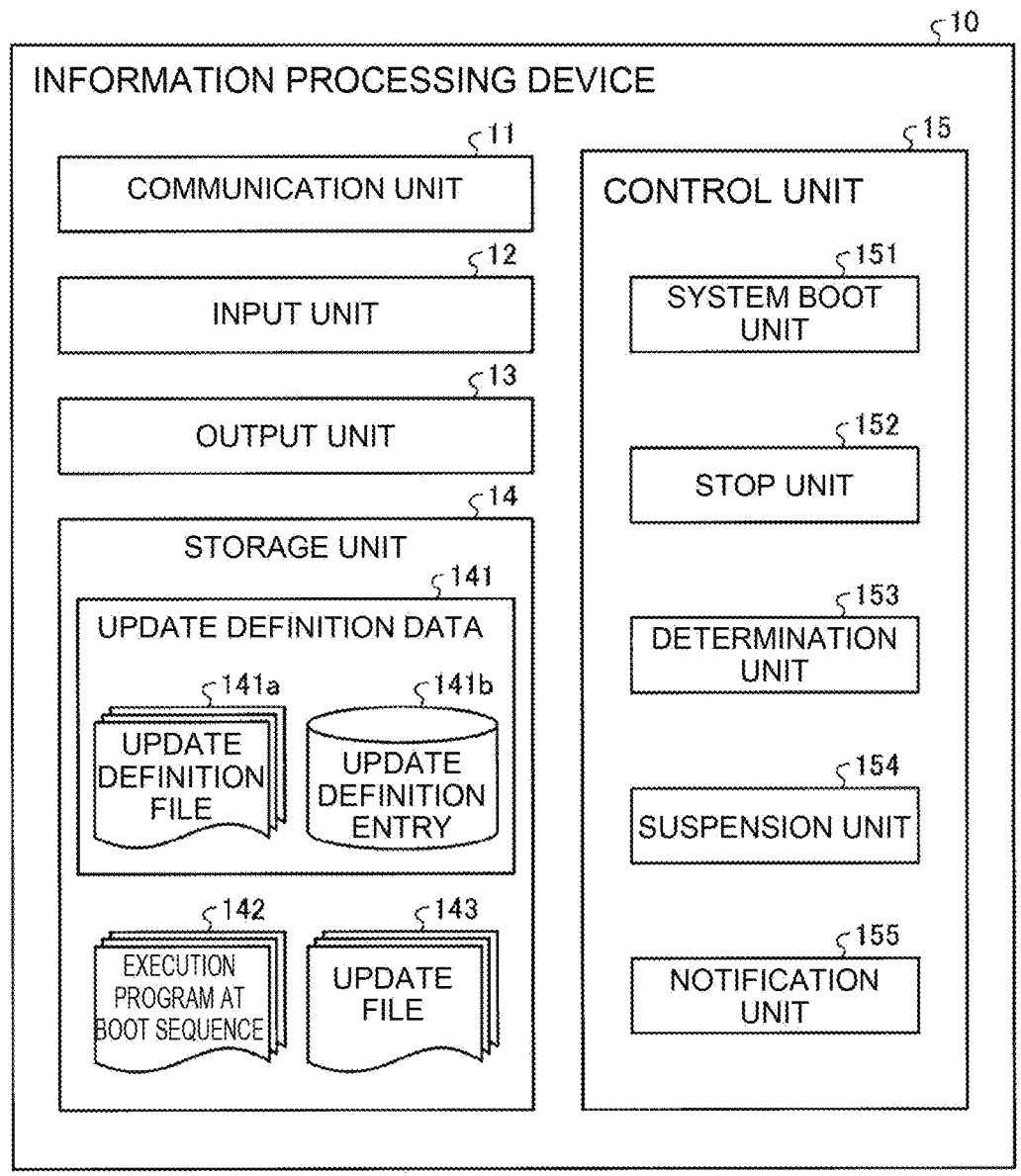
FIG. 1 is a diagram illustrating an example of a configuration of an information processing device relating to a first embodiment.
Figure 2:
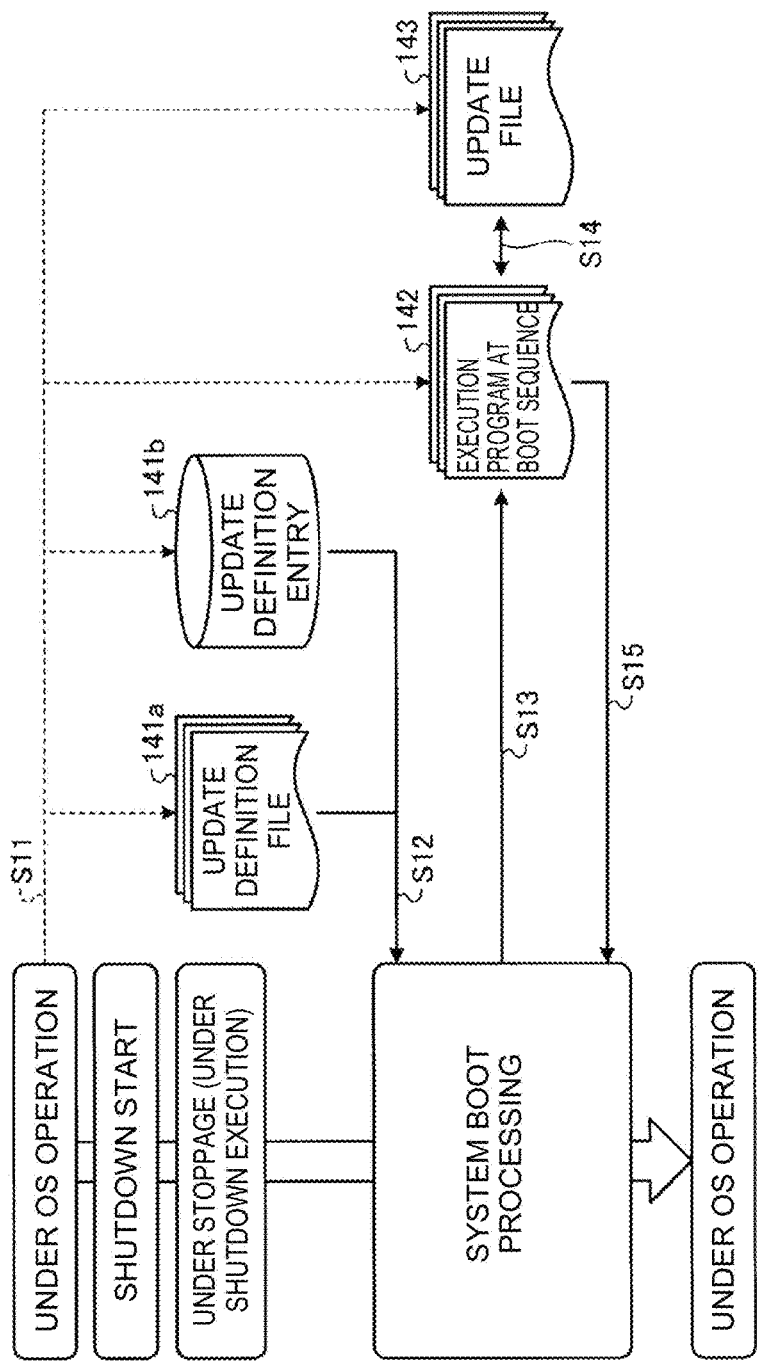
FIG. 2 is a diagram for describing alteration.

Using FIG. 1, a configuration of the information processing device relating to a first embodiment will be described. FIG. 2 is a diagram illustrating an example of the configuration of the information processing device relating to the first embodiment. As illustrated in FIG. 1, an information processing device 10 includes a communication unit 11, an input unit 12, an output unit 13, a storage unit 14 and a control unit 15.

The communication unit 11 performs data communication with another device via a network. For example, the communication unit 11 is an NIC (Network Interface Card). The input unit 12 is an input device such as a mouse or a keyboard which receives input of data from a user. The output unit 13 is an output device such as a display which outputs data.

The storage unit 14 is a storage device such as an HDD (Hard Disk Drive), an SSD (Solid State Drive) or an optical disc. Note that the storage unit 14 may be a data-rewritable semiconductor memory such as a RAM (Random Access Memory), a flash memory or an NVSRAM (Non Volatile Static Random Access Memory). The storage unit 14 stores an OS and various kinds of programs executed in the information processing device 10. Further, the storage unit 14 stores various kinds of information used in execution of the programs. In addition, the storage unit 14 stores update definition data 141, an execution program at boot sequence 142 and an update file 143.

The update definition data 141 is data for defining file update executed at reboot sequence of the OS. As illustrated in FIG. 1, the update definition data 141 includes an update definition file 141a and an update definition entry 141b. For example, when the OS is a Windows OS, the update definition file 141a is a file such as "wininit.ini". In addition, for example, when the OS is the Windows OS, the update definition entry 141b is an entry such as "PendingFileRenameOperations" of a registry.

The execution program at boot sequence 142 is a program executed during a boot sequence of the OS. For example, when the OS is the Windows OS, the execution program at boot sequence 142 is an execution such as "wininit.exe".

The update file 143 is a file for updating the execution program at boot sequence 142 by substitution or the like. For example, when the OS is the Windows OS, the update file 143 is the "wininit.exe" of an update version.

The control unit 15 controls the entire information processing device 10. The control unit 15 is, for example, an electronic circuit such as a CPU (Central Processing Unit) or an MPU (Micro Processing Unit) or an integrated circuit such as an ASIC (Application Specific Integrated Circuit) or an FPGA (Field Programmable Gate Array). In addition, the control unit 15 includes an internal memory for storing programs stipulating various kinds of processing procedures and control data, and executes individual processing using the internal memory. In addition, the control unit 15 functions as various kinds of processing units by various kinds of programs being operated. For example, the control unit 15 includes a system boot unit 151, a stop unit 152, a determination unit 153, a suspension unit 154, and a notification unit 155.

The system boot unit 151 executes the boot sequence of the OS and configures the OS. The stop unit 152 executes shutdown of the OS and stops the OS.

The determination unit 153 determines whether or not there is integrity in predetermined data regarding boot sequence of the OS during the execution of the shutdown of the OS. The determination unit 153 can determine whether or not there is integrity in the update definition data 141 which defines the file update at the boot sequence of the OS. The determination unit 153 can determine whether or not there is integrity in the execution program at boot sequence 142 executed at the boot sequence of the OS or the update file 143 for updating the execution program at boot sequence 142.

Here, data update indicates data change allowed by a user or the like. For example, the data update is generated accompanying installation of a new program and periodical system update or the like. On the other hand, data alteration indicates data change not allowed by a user or the like. For example, data is altered by a malicious person and malware or the like (an attack subject, hereinafter).

The determination unit 153 determines presence/absence of integrity by collating a hash value and setting content of a file. For example, when the predetermined data is updated, the information processing device 10 calculates a first hash value of updated data, and stores the value in a ROM (Read Only Memory) which is a nonvolatile storage area together with a path for accessing the predetermined data. Then, the determination unit 153 calculates a second hash value of the predetermined data at timing of making determination. Then, the determination unit 153 determines that there is integrity in the predetermined data when the first hash value and the second hash value are the same. In addition, the determination unit 153 determines that there is no integrity in the predetermined data when the first hash value and the second hash value are different.

Note that the information processing device 10 can confirm the integrity of the program for executing control processing of the present embodiment, that is, the program for achieving the determination unit 153 or the like by a similar method. In particular, the determination unit 153 determines whether or not there is integrity in a determination program for executing determination processing.

Further, the determination unit 153 may perform the individual determination processing according to an update situation of the update definition data 141. In this case, the determination unit 153 determines whether or not the file update is defined by the update definition data 141 which defines the file update at the boot sequence of the OS. When it is determined that the file update is not defined by the update definition data 141, the determination unit 153 determines whether or not there is integrity in the execution program at boot sequence 142 executed at the boot sequence of the OS. On the other hand, when it is determined that the file update is defined by the update definition data 141, the determination unit 153 determines whether or not there is integrity in the update definition data 141, the execution program at boot sequence 142 executed at the boot sequence of the OS, and the update file 143 for updating the program.

Here, the determination unit 153 can determine whether or not the file update is defined by a method similar to the method of determining data integrity. That is, the determination unit 153 determines that the file update is defined by the update definition data 141 when the hash value of the update definition data 141 at a point of time when the OS is configured and the hash value of the update definition data 141 when the shutdown is started are different. Note that the file update defined here is executed at the next boot sequence of the OS.

When it is determined that there is no integrity in the predetermined data by the determination unit 153, the suspension unit 154 suspends the shutdown of the OS. When it is determined that there is no integrity in the predetermined data by the determination unit 153, the notification unit 155 notifies alteration content for the predetermined data. For example, the notification unit 155 may display a warning of a possibility that the alteration is made and text indicating alteration content to the output unit 13 which is a display.

Here, the determination program for executing the determination processing by the determination unit 153 will be concretely described. It is assumed that the determination program is booted by a boot sequence of the OS, and resides in a volatile storage memory (what is called memory). In addition, data of the determination program is stored in a nonvolatile storage area (ROM). Further, the data stored in the nonvolatile storage area is not altered when a power of the information processing device 10 is off, and may be altered when the power of the information processing device 10 is on.

The determination program residing in the memory acquires object data from the ROM when an OS shutdown instruction is detected. The object data here includes the data of the determination program itself that executes the determination processing by the determination unit 153, in addition to the update definition data 141, the execution program at boot sequence 142 and the update file 143.

The determination unit 153 calculates a hash value of the acquired object data. Further, the determination unit 153 acquires a correct value of the hash value from the ROM. Then, when the calculated hash value and the correct value match, the determination unit 153 determines that there is no alteration. On the other hand, when the calculated hash value and the correct value do not match, the determination unit 153 determines that there is alteration. In addition, when it is determined that the data of the determination program itself is altered, the information processing device 10 may perform recovery processing of the determination program.

Here, using FIG. 2, the data alteration and a damage caused by the alteration will be described. FIG. 2 is a diagram for describing the alteration. In an example in FIG. 2, it is assumed that the alteration is not avoided by the present embodiment. First, the attack subject alters the update definition file 141*a*, the update definition entry 141*b*, the execution program at boot sequence 142 and the update file 143 during an OS operation (step S11).

Thereafter, when the alteration is not avoided, the OS is stopped when shut down, and the system is booted in an altered state. At the time, in the case where the update definition file 141*a* and the update definition entry 141*b* are altered, unauthorized file update is performed according to altered setting (steps S12 and S13). In addition, in the case where the update file 143 is altered, the execution program at boot sequence 142 is replaced with an unauthorized file (step S14). Further, in the case where the execution program at boot sequence 142 is altered and the update of the execution program at boot sequence 142 is not defined, the altered execution program at boot sequence 142 is executed (step S15).

Figure 3:
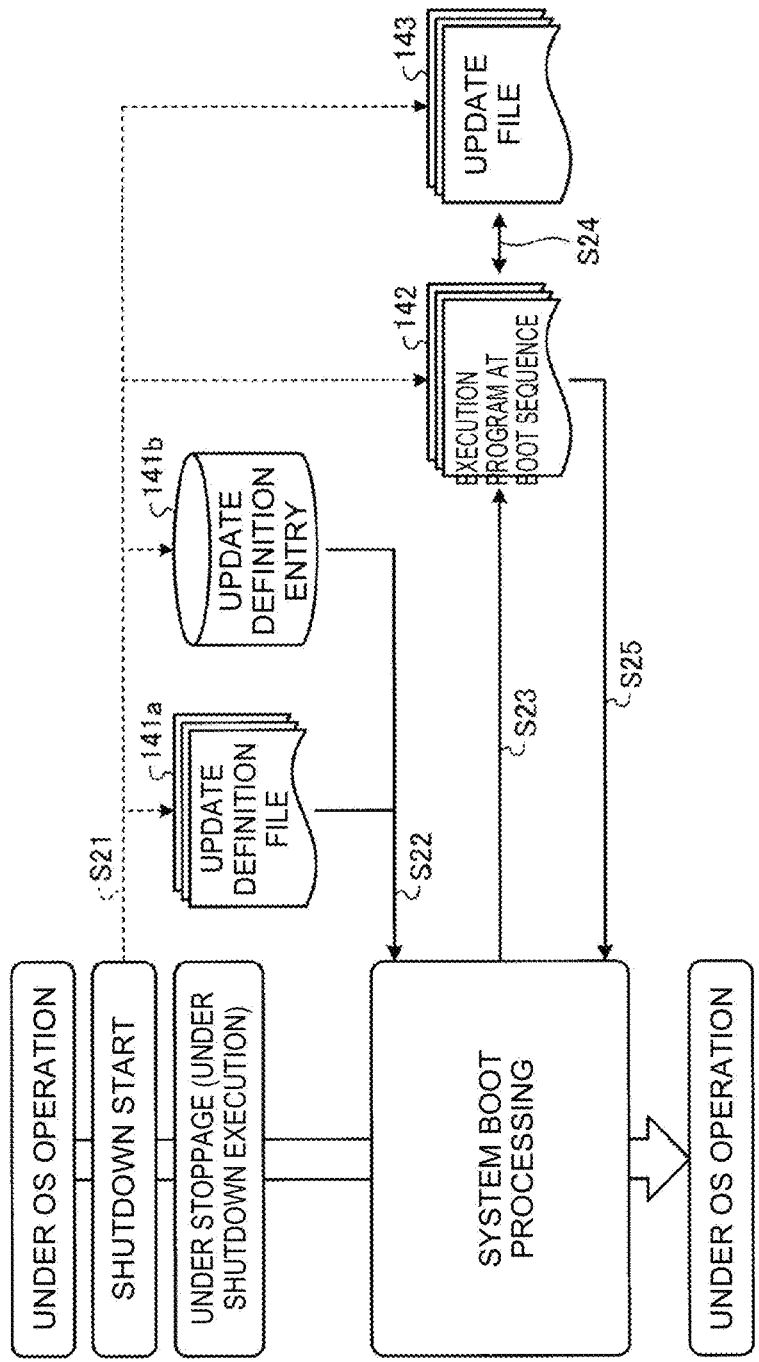
FIG. 3 is a diagram for describing an alteration avoidance method.

Using FIG. 3, an alteration avoidance method by the present embodiment will be described. FIG. 3 is a drawing for describing the alteration avoidance method. As illustrated in FIG. 3, when the shutdown is started, the determination unit 153 determines whether or not there is integrity in the update definition file 141*a*, the update definition entry 141*b*, the execution program at boot sequence 142 and the update file 143 (step S21).

Here, when it is determined that there is integrity in the update definition file 141*a* and the update definition entry 141*b*, the information processing device 10 performs the file update according to the update definition file 141*a* and the update definition entry 141*b* the integrity of which is confirmed, at the next system boot processing (step S22).

When it is determined that there is integrity in the update file 143, the execution program at boot sequence 142 is replaced with the non-altered regular update file 143 (steps S23 and S24). In addition, when it is determined that there is integrity in the execution program at boot sequence 142, in the case where the update of the execution program at boot sequence 142 is not defined, the non-altered regular execution program at boot sequence 142 is executed (step S25).

Processing in First Embodiment

Figure 4:
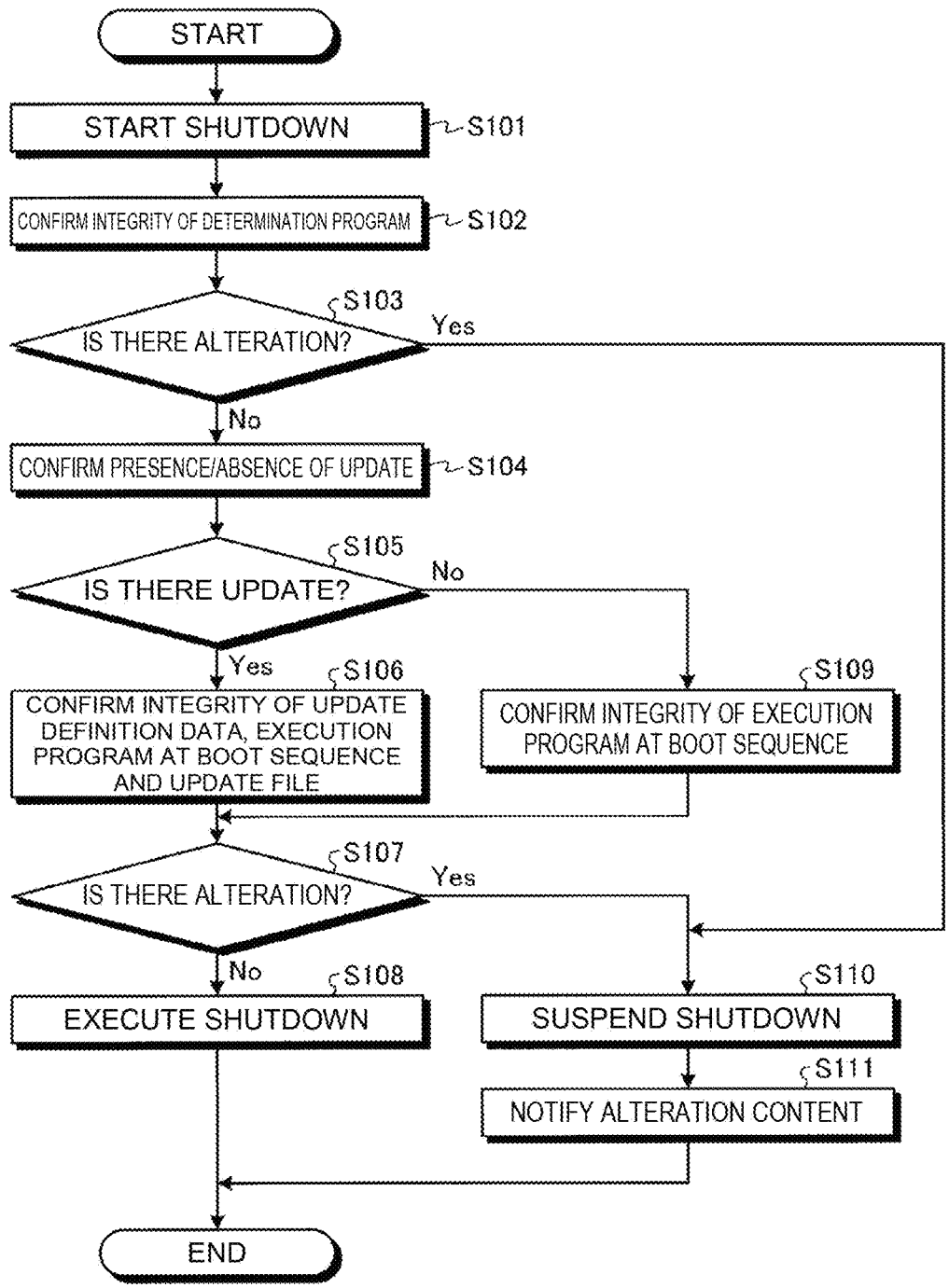
FIG. 4 is a flowchart illustrating a flow of processing of controlling the information processing device relating to the first embodiment.

Using FIG. 4, a flow of control processing of controlling the information processing device 10 will be described. FIG. 4 is a flowchart illustrating the flow of processing of controlling the information processing device relating to the first embodiment. As illustrated in FIG. 4, the stop unit 152 starts the shutdown of the OS provided in the information processing device 10 (step S101).

Here, the determination unit 153 confirms the integrity of the determination program for executing the processing of the determination unit 153 itself first (step S102). When the determination unit 153 determines that the determination program is not altered (step S103, No), the information processing device 10 advances to step S104. On the other hand, when the determination unit 153 determines that the determination program is altered (step S103, Yes), the information processing device 10 advances to step S110.

Next, the determination unit 153 determines presence/absence of the update of the update definition data 141 (step S104). When there is the update (step S105, Yes), the determination unit 153 confirms the integrity of the update definition data 141, the execution program at boot sequence 142 and the update file 143 further (step S106). At the time, the determination unit 153 determines whether or not there has been the alteration by determining whether or not there is integrity in each data.

When it is determined that there is the alteration (step S107, Yes), the suspension unit 154 suspends the shutdown (step S110). Then, the notification unit 155 notifies the alteration content (step S111). On the other hand, when it is determined that there is no alteration (step S107, No), the stop unit 152 continuously executes the shutdown (step S108).

Returning to step S105, when there is no update of the update definition data 141 (step S5105, No), the determination unit 153 confirms the integrity of the execution program at boot sequence 142 further (step S109). When it is determined that there is the alteration (step S107, Yes), the suspension unit 154 suspends the shutdown (step S110). Then, the notification unit 155 notifies the alteration content (step S111). On the other hand, when it is determined that there is no alteration (step S107, No), the stop unit 152 continuously executes the shutdown (step S108).

Figure 5:
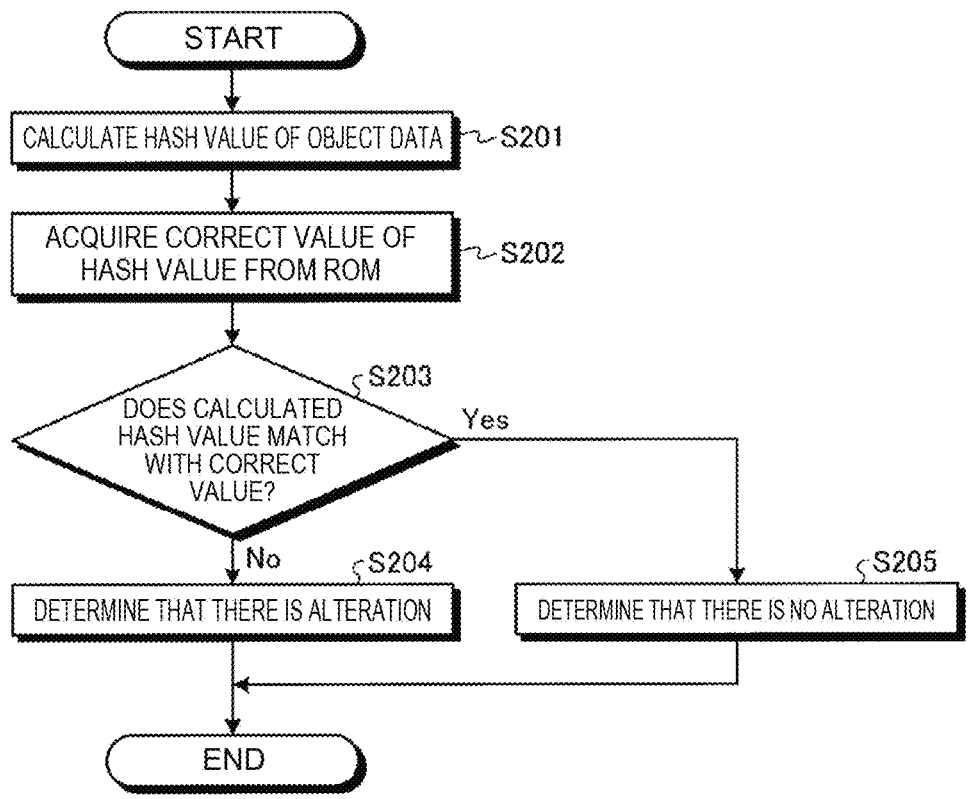
FIG. 5 is a flowchart illustrating a flow of determination processing.

Using FIG. 5, the determination processing by the determination unit 153 will be described. FIG. 5 is a flowchart illustrating a flow of the determination processing. It is assumed that, for the determination program that executes the determination processing by the determination unit 153, the execution is started at the boot sequence of the OS, and the determination program resides in the nonvolatile storage area (RAM).

As illustrated in FIG. 5, the determination unit 153 calculates a hash value of the object data (step S201). The object data here includes the determination program itself that executes the determination processing by the determination unit 153, in addition to the update definition data 141, the execution program at boot sequence 142 and the update file 143.

Next, the determination unit 153 acquires the correct value of the hash value from the ROM (step S202). Then, when the calculated hash value and the correct value match (step S203, Yes), the determination unit 153 determines that there is no alteration (step S205). On the other hand, when the calculated hash value and the correct value do not match (step S203, No), the determination unit 153 determines that there is alteration (step S204).

Effect of First Embodiment

As described above, the determination unit 153 determines whether or not there is integrity in the predetermined data regarding the boot sequence of the OS during the execution of the shutdown of the OS. The suspension unit 154 suspends the shutdown of the OS when it is determined that there is no integrity in the predetermined data by the determination unit 153. In such a manner, the information processing device 10 can confirm the integrity of the data regarding the boot sequence at the time of the shutdown. Therefore, according to the present embodiment, even in an apparatus not loaded with a TPM and an environment where signature verification cannot be executed or the like, the file alteration and the execution of an altered program can be avoided.

The notification unit 155 notifies the alteration content for the predetermined data when it is determined that there is no integrity in the predetermined data by the determination unit 153. Thus, a user can take a measure before an altered program or the like is executed.

The determination unit 153 determines whether or not there is integrity in the update definition data 141 which defines the file update at the boot sequence of the OS. Thus, even when the update file itself is not altered and the file which defines the update is altered, influence by the alteration can be prevented.

The determination unit 153 determines whether or not there is integrity in the execution program at boot sequence 142 executed at the boot sequence of the OS or the update file 143 for updating the execution program at boot sequence 142. Thus, when the update file itself is altered, the influence by the alteration can be prevented.

The determination unit 153 determines whether or not the file update is defined by the update definition data 141 which defines the file update at the boot sequence of the OS. When it is determined that the file update is not defined by the update definition data 141, the determination unit 153 determines whether or not there is integrity in the execution program at boot sequence 142 executed at the boot sequence of the OS. When it is determined that the file update is defined by the update definition data 141, the determination unit 153 determines whether or not there is integrity in the update definition data 141, the execution program at boot sequence 142 executed at the boot sequence of the OS and the update file 143 for updating the program. In such a manner, the information processing device 10 can determine the data to confirm integrity according to the update situation of the individual data. Thus, the information processing device 10 can efficiently execute the processing for avoiding the alteration.

The determination unit 153 performs the processing of determining whether or not there is integrity in the predetermined data including the data of the determination program by the determination program residing in the volatile storage area. The determination unit 153 performs the processing of determining whether or not there is integrity by the program residing in the volatile storage area. The determination unit 153 determines whether or not there is integrity in the predetermined data depending on whether or not a predetermined calculated value calculated from the predetermined data stored in the nonvolatile storage area and the correct value stored in the nonvolatile storage area match. The data stored in the nonvolatile area is altered while the information processing device 10 is booted. Therefore, according to the present embodiment, by confirming that the determination unit program itself is not altered at system shutdown, it is surely guaranteed that the correct determination unit program is to be booted and reside in the volatile memory again at the next system boot processing.

System Configuration or the Like

In addition, illustrated individual components of individual devices are functionally conceptual, and do not need to be physically configured as illustrated. That is, a specific form of dispersion and integration of the individual devices is not limited to the illustration, and all, some, or one can be functionally or physically dispersed or integrated in arbitrary units and configured according to various kinds of loads and use situations or the like. Further, for individual processing functions performed in the individual devices, all, some, or arbitrary one can be achieved by a CPU and a program analyzed and executed in the CPU, or achieved as hardware by wired logic.

Further, of the individual processing described in the present embodiment, all or some of the processing described as automatically performed can be manually performed, or all or some of the processing described as manually performed can be automatically performed by a known method. In addition, information including the processing procedures, control procedures, specific names, various kinds of data and parameters illustrated in the above-described document and in the drawings can be arbitrarily changed unless otherwise specified.

Program

As one embodiment, the information processing device 10 can be mounted by installing a control program which executes the above-described control to a desired computer as package software or online software. For example, by making an information processing device execute the above-described control program, the information processing device can be made to function as the information processing device 10. The information processing device here includes a desktop-type or a notebook-type personal computer. In addition, the information processing device includes a mobile communication terminal such as a smartphone, a cellular phone and a PHS (Personal Handyphone System) and a slate terminal such as a PDA (Personal Digital Assistant) or the like in the category.

Figure 6:
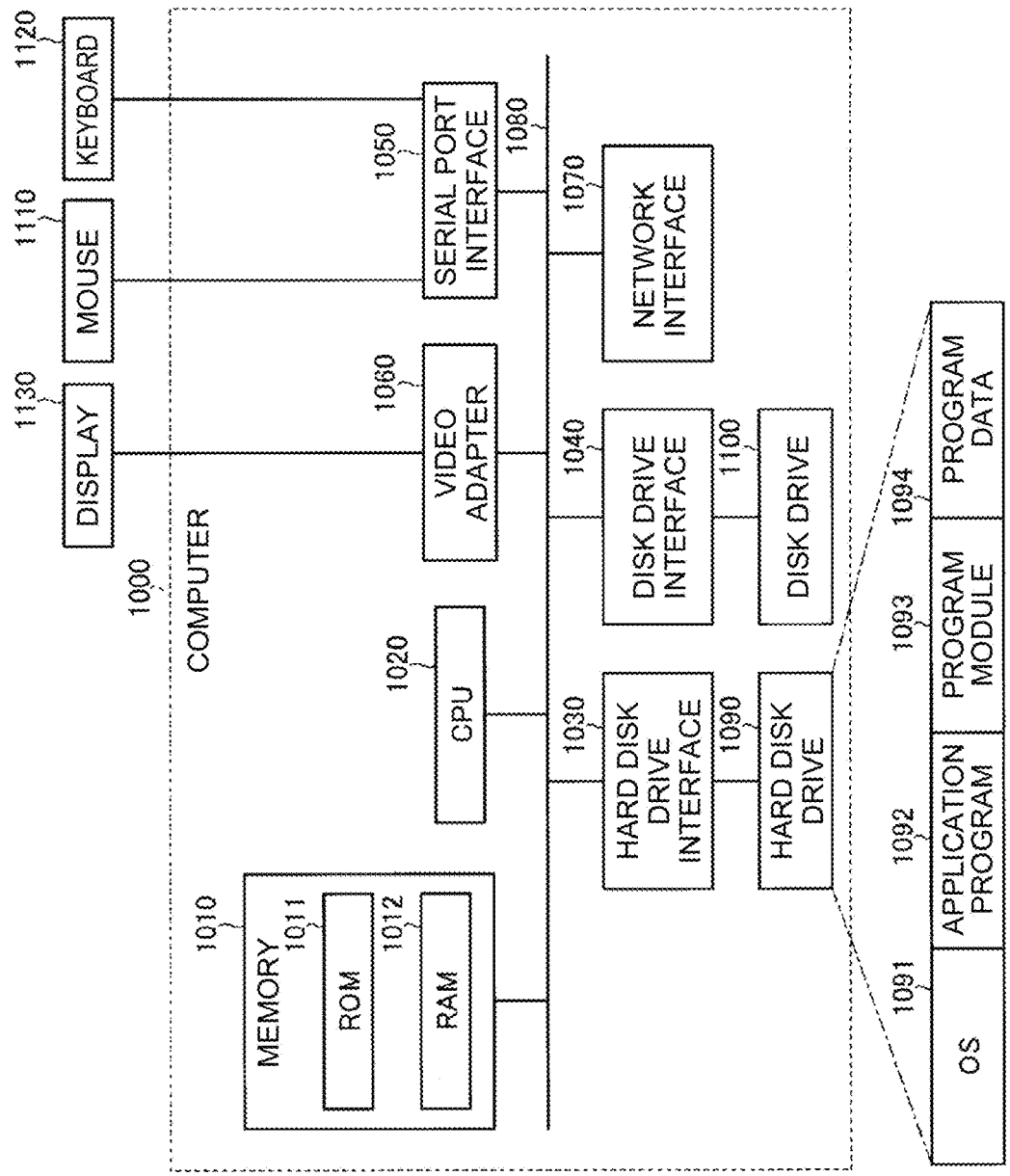
FIG. 6 is a diagram illustrating an example of a computer which executes a control program.

FIG. 6 is a diagram illustrating an example of the computer which executes the control program. A computer 1000 includes a memory 1010 and a CPU 1020, for example. In addition, the computer 1000 includes a hard disk drive interface 1030, a disk drive interface 1040, a serial port interface 1050, a video adapter 1060, and a network interface 1070. The individual units are connected by a bus 1080.

The memory 1010 includes a ROM 1011 and a RAM 1012. The ROM 1011 stores a boot program of a BIOS (Basic Input Output System) or the like, for example. The hard disk drive interface 1030 is connected to a hard disk drive 1090. The disk drive interface 1040 is connected to a disk drive 1100. A detachable storage medium such as a magnetic disk or an optical disc is inserted to the disk drive 1100. The serial port interface 1050 is connected to a mouse 1110 and a keyboard 1120, for example. The video adapter 1060 is connected to a display 1130, for example.

The hard disk drive 1090 stores, for example, an OS 1091, an application program 1092, a program module 1093, and program data 1094. That is, the program stipulating the individual processing of the information processing device 10 is mounted as the program module 1093 in which codes executable by the computer are described. The program module 1093 is stored in the hard disk drive 1090, for example. For example, the program module 1093 for executing the processing similar to the functional configuration in the information processing device 10 is stored in the hard disk drive 1090. Note that the hard disk drive 1090 may be replaced with an SSD.

In addition, setting data used in the processing of the above-described embodiment is stored as the program data 1094 in the memory 1010 or the hard disk drive 1090, for example. Then, the CPU 1020 reads the program module 1093 and the program data 1094 stored in the memory 1010 or the hard disk drive 1090 to the RAM 1012 as needed, and executes the processing of the above-described embodiment.

Note that the program module 1093 and the program data 1094 may be stored in a detachable storage medium, for example, and read by the CPU 1020 via the disk drive 1100 or the like, without being limited to the case of being stored in the hard disk drive 1090. Or, the program module 1093 and the program data 1094 may be stored in another computer connected via a network (such as a LAN (Local Area Network) or a WAN (Wide Area Network)). Then, the program module 1093 and the program data 1094 may be read from the other computer by the CPU 1020 via the network interface 1070.

REFERENCE SIGNS LIST

10 Information processing device
11 Communication unit
12 Input unit
13 Output unit
14 Storage unit
15 Control unit
141 Update definition data
141*a* Update definition file
141*b* Update definition entry
142 Execution program at boot sequence
143 Update file
151 System boot unit
152 Stop unit
153 Determination unit
154 Suspension unit
155 Notification unit

The invention claimed is:

1. An information processing device comprising:
   processing circuitry configured to:
      determine whether or not there is integrity in predetermined data regarding a boot sequence of an Operating System (OS) during execution of shutdown of the OS; and
      suspend shutdown of the OS when it is determined that there is no integrity in the predetermined data.

2. The information processing device according to claim 1, wherein the processing circuitry is further configured to notify alteration content for the predetermined data when it is determined that there is no integrity in the predetermined data.

3. The information processing device according to claim 1, wherein the processing circuitry is further configured to determine whether or not there is integrity in update definition data which defines file update at the boot sequence of the OS.

4. The information processing device according to claim 1, wherein the processing circuitry is further configured to determine whether or not there is integrity in a program executed at the boot sequence of the OS or a file for updating the program.

5. The information processing device according to claim 1,
   wherein the processing circuitry is further configured to
      determine whether or not a file update is defined by update definition data which defines the file update at the boot sequence of the OS,
      determine whether or not there is integrity in a program executed at the boot sequence of the OS when it is determined that the file update is not defined by the update definition data, and
      determine whether or not there is integrity in the update definition data, the program executed at the boot sequence of the OS and a file for updating the program, when it is determined that the file update is defined by the update definition data.

6. The information processing device according to claim 1,
   wherein the processing circuitry is further configured to
      perform processing of determining whether or not there is integrity in predetermined data including data of a determination program residing in a volatile storage area, by the determination program, and
      determine whether or not there is integrity in the predetermined data depending on whether or not a predetermined calculated value calculated from the predetermined data stored in a nonvolatile storage area and a correct value stored in the nonvolatile storage area match.

7. The information processing device according to claim 1, wherein the processing circuitry determines whether or not there is integrity in the predetermined data based on a hash value computed by the processor for the predetermined data.

8. The information processing device according to claim 7, wherein the processor computes the hash value during the execution of shutdown of the OS.

9. The information processing device according to claim 8, wherein the processing circuitry compares the hash value with a previous hash value computed during a previous update of the predetermined data to determine whether or not there is integrity in the predetermined data.

10. The information processing device according to claim 9, wherein the processing circuitry stoles the previous hash value in non-volatile memory during the previous update of the predetermined data.

11. A control method executed by an information processing device, comprising:
   determining whether or not there is integrity in predetermined data regarding a boot sequence of an Operating System (OS) provided in the information processing device during execution of shutdown of the OS; and
   suspending shutdown of the OS when it is determined that there is no integrity in the predetermined data.

12. The control method according to claim 11, wherein whether or not there is integrity in the predetermined data is determined based on a hash value computed by the processor for the predetermined data.

13. The control method according to claim 12, further comprising computing the hash value during the execution of shutdown of the OS.

14. The control method according to claim 13, further comprising comparing the hash value with a previous hash value computed during a previous update of the predetermined data to determine whether or not there is integrity in the predetermined data.

15. The control method according to claim 14, further comprising storing the previous hash value in non-volatile memory during the previous update of the predetermined data.

16. A non-transitory computer-readable recording medium storing therein a control program that causes a computer to execute a process comprising:
   determining whether or not there is integrity in predetermined data regarding a boot sequence of an Operating System (OS) provided in the information processing device during execution of shutdown of the OS; and
   suspending shutdown of the OS when it is determined that there is no integrity in the predetermined data.

17. The non-transitory computer-readable recording medium according to claim 16, wherein whether or not there is integrity in the predetermined data is determined based on a hash value computed by the processor for the predetermined data.

18. The nontransitory computer-readable recording medium according to claim 17, further comprising computing the hash value during the execution of shutdown of the OS.

19. The non-transitory computer-readable recording medium according to claim 18, further comprising comparing the hash value with a previous hash value computed during a previous update of the predetermined data to determine whether or not there is integrity in the predetermined data.

20. The nontransitory computer-readable recording medium according to claim 19, further comprising storing the previous hash value in non-volatile memory during the previous update of the predetermined data.

* * * * *